United States Patent [19]

Schäfer et al.

[11] Patent Number: 5,019,198

[45] Date of Patent: May 28, 1991

[54] METHOD FOR THE DECORATIVE SURFACE COATING OF FLAT SUBSTRATES

[75] Inventors: Werner Schäfer, Essen-Kettwig; Manfred Scheiba, Essen, all of Fed. Rep. of Germany

[73] Assignee: Th. Goldschmidt AG, Essen, Fed. Rep. of Germany

[21] Appl. No.: 490,785

[22] Filed: Mar. 8, 1990

Related U.S. Application Data

[63] Continuation-in-part of Ser. No. 241,943, Sep. 8, 1988.

[51] Int. Cl.$^5$ ................................................. B44C 1/00
[52] U.S. Cl. ..................................... 156/230; 106/415; 156/240; 428/40; 428/195
[58] Field of Search .................. 156/230, 240; 428/40, 428/195; 106/415

[56] References Cited

U.S. PATENT DOCUMENTS

| | | | |
|---|---|---|---|
| 4,101,698 | 7/1978 | Dunning et al. | 428/414 X |
| 4,373,963 | 2/1983 | Uenishi et al. | 106/415 |
| 4,763,985 | 8/1988 | Bingham | 350/165 |
| 4,820,686 | 4/1989 | Ito et al. | 428/195 X |

*Primary Examiner*—David A. Simmons
*Assistant Examiner*—James J. Engel, Jr.
*Attorney, Agent, or Firm*—Toren, McGeady & Associates

[57] ABSTRACT

A method is disclsed for surface improving sheet-like substrates to impart them with a marbleized effect. A transfer sheet is pressed on the substrate at elevated temperatures. The transfer sheet is comprised of superimposed layers of synthetic resin. The resin layer closest to the backing of the transfer sheet is devoid of pigments, while the resin layer adjacent the pigment free layer comprises 2 to 40% by weight, calculated on the amount of resin, of a flake-like pigment. The pressing of the transfer sheet against the substrate is carried out with a press tool devoid of surface pattern and having a generally flat press surface.

13 Claims, No Drawings

METHOD FOR THE DECORATIVE SURFACE COATING OF FLAT SUBSTRATES

CROSS REFERENCE TO RELATED APPLICATION

This is a continuation-in-part of pending application Ser. No. 07/241,943, filed Sept. 8, 1988.

FIELD OF INVENTION

The invention generally relates to the surface improvement or finishing of articles and is particularly directed to a procedure or method for imparting a marbleized surface effect of flat or planar substrates. The term "flat or planar substrate" as used herein is deemed to refer to any material which may be surface improved or coated and includes in particular molded laminated materials and panels derived from or containing wood products, gypsum, cement and the like. The decorative coating to obtain a marbleized effect on the flat or planar substrate is, pursuant to the inventive procedure, carried out with a synthetic resin coated support sheet or web, suitable for transfer printing, wherein the coated support sheet or web (hereinafter "transfer sheet") is pressed at elevated temperature onto the substrate with the coated surface of the transfer sheet facing the surface of the substrate to be coated, thereby to transfer the synthetic resin onto the substrate surface, whereupon the backing of the transfer sheet is pulled or peeled from the coated substrate.

BACKGROUND INFORMATION AND PRIOR ART

In accordance with the state of the art, panels derived from wood products, such as chipboards, fiber boards, plywood panels, wood core plywood, panels of cellulose waste or laminates from a plurality of core paper layers containing resin, are finished or improved on a large scale with decorative transfer sheets, which usually are impregnated with aminoplast resins, curable at elevated temperatures, and coated with curable or thermoplastic condensation or polymerization resins. Products with particularly advantageous use properties are obtained if melamine-formaldehyde precondensates are used for the impregnation of curable polymerization resins, such as copolymers based on (meth-)acrylate esters or unsaturated polyester resins for the coating. This state of the art is described in great detail, for example in the German Patents 2,734,669 and 3,403,691.

The surface coating of the substrate, such as a chipboard, with the synthetic resin-containing transfer sheet may be accomplished by pressing the decorative, resin-coated transfer sheet on the substrate with the aid of a pressure plate in a hot press at temperatures of about 130° to 180° C. and a pressure of about 0.3 to 10 N/mm². In so doing, the covering layer of resin assumes a degree of gloss corresponding to the surface of the pressure plate. It is also possible first to cure the resin-coated transfer sheets and then to glue them on the substrates if necessary with glue presses. In the case of laminates, which comprise several layers or core papers impregnated with curable resins, the formation of the laminate by pressing the core papers while curing of the impregnating resins and the surface coating of the substrate can be undertaken simultaneously in one working cycle.

Cement fiber panels or gypsum plaster board can be finished in much the same way as panels derived from wood products. Light-weight prefabricated flat structural elements such as panels with a honeycomb structure, which may be covered with a metal foil such as an aluminum foil, can also be finished or coated in this manner.

A further possibility of finishing previously coated flat materials consists of applying a surface coating of synthetic resin on these materials by means of the transfer method. For this purpose, a transfer sheet having an adhesive backing is coated with the synthetic resin, to be transferred to the precoated material to be finished. The coated transfer sheet is pressed onto the precoated material, whereby the coat of the flat material combines with the synthetic resin layer. After the transfer, the backing of the transfer sheet is pulled off from the synthetic resin layer. The synthetic resin layer then forms the outer surface of the finished material. It is, however, also possible to produce the flat material and the coating of the surface at the same time. For this purpose, a synthetic resin-coated transfer sheet is placed on and, if necessary, another one below the press package, which latter is built up in the usual way and ultimately forms the flat material. The finishing of the surface takes place simultaneously with the shaping of the material by the pressure exerted on the press package in a heated press.

The synthetic resin forming the surface layer of the transfer sheet may be pigmented or unpigmented. If the synthetic resin does not contain any pigment, the decor and/or the color of the subjacent surface of the finished substrate shines through the surface coating. By pigmenting or coloring the synthetic resin layer of the transfer sheet, the opportunity for an additional decorative presentation of the surface is provided. In such a case, the synthetic resin layer applied in the transfer method not only has the task of forming a mechanically and chemically resistant surface on the finished material, but also additionally has a decorative function.

It is also feasible to provide a structured pattern on the surface of the improved substrate. Generally, this is accomplished during the pressing procedure, wherein the pattern or structuring is performed by employing a press tool having a relief-like or embossed surface whose structure or pattern is then impressed on the decorative surface layer as the corresponding negative. If the profiling or pattern of the press tool is sufficiently deep and distinct, particular color effects can be obtained if the superimposed resin layers have different color tones, to wit, have been dyed in different manner. In thus obtaining special color effects and during the pressing with the press tool, the top colored resin layer facing the press tool is then pressed away in a lateral direction by the raised areas of the press tool. These areas or portions which are thus subjected to the pressure of the raised portions of the tool then flow to areas of lesser compression exerted by the press tool. Corresponding to the raised areas of the press tool pattern, the color of the resin layer situated below the top resin layer is then recognizable and/or the color of the substrate can be seen.

OBJECTS OF THE INVENTION

It is the primary object of the invention to provide a method for the decorative surface improvement of flat or planar substrates pursuant to the transfer technique.

More particularly, it is an object of the invention to provide a method for imparting flat or planar substrates of the kind defined with a marbleized decorative surface pursuant to the transfer technique. The term "marbleized effect" as used herein refers to the non-uniform distribution of the color imparting medium in the surface layer of the synthetic resin layers, which effect has a certain similarity to the color distribution of true marble.

It is also an object of the invention to form surface layers of synthetic resin on the surface of substrates, especially of those derived from wood products, by means of the transfer sheets, wherein the surface layers not only protect the substrate in a superior manner, but also exhibit a special decorative marbleizing effect. The transfer sheets to be used pursuant to the inventive procedure are thus especially suitable for surface improving materials or substrates which are intended for the production of objects with decorative surfaces, such as doors, furniture, table tops, facade elements, exhibition stands or for the design of rooms, such as foyers, waiting rooms, counter rooms, etc.

SUMMARY OF THE INVENTION

Pursuant to the invention marbleized decorative surfaces of superior quality are obtained by proceeding as follows:

a) A transfer sheet having an adhesive backing is used which has two superimposed layers of a transparent, thermoplastic or duroplastic synthetic resin which flows well under pressing conditions. The outer layer of the synthetic resin contains a flake-shaped (lamellar) pigment in an amount of 2 to 40% by weight, calculated on the synthetic resin, while the synthetic resin layer lying on the backing of the transfer sheet is devoid of pigment.

b) The pressing of the transfer sheet onto the substrate is carried out with a press tool which is devoid of surface patterns or profiles and thus presents a substantially flat surface.

Pursuant to the invention, the concept of a flake-shaped (lamellar) pigment refers to a planar pigment of very small layer thickness. The particle size of the pigment, as concerns its planar extent or dimension, is preferably 5 to 100 $\mu$m. The thickness of the pigment is substantially less and usually smaller than 1 $\mu$m.

In carrying out the inventive procedure, a transfer sheet is preferably used wherein the flake-shaped (lamellar) pigment is contained in the outer synthetic resin layer facing away from the backing in an amount of preferably 5 to 20% by weight based on the amount of synthetic resin.

Such flake-shaped (lamellar) pigments are known to those skilled in the art. An especially suitable and, therefore, preferred pigment of the desired spatial shape is mica, the surface of which has been enriched or acted upon by metal oxides, preferably titanium dioxide or iron oxide. Such pigments are lustrous pigments which impart a metal effect to the transfer sheet. Such pigments are obtainable in the trade under the name of Iriodin ® pigments.

A different example of flake-shaped (lamellar) pigments are the metal pigments obtainable from metals or metal alloys by rolling and comminuting. To prepare these pigments, preferably ductile metals or alloys are used. Aluminum, copper and silver as metals and brass and bronze alloys as alloys are preferred starting materials for this purpose.

Special metal color effects are obtained if the metal surfaces, especially the surfaces of aluminum pigments, are acted upon by metal oxides, preferably iron oxides.

For the state of the art, reference is made to the publications "Eisenoxidbeschichtete Aluminiumpigmente" (Iron Oxide Coated Aluminm Pigments) and "Optische Eigenschaften von Perlglanzpigmenten" (Optical Properties of Lustrous Pigments) in the journal "farbe+lack" (1987), pages 973 to 979.

The synthetic resin may additionally be dyed with a dye soluble in the synthetic resin. To achieve special color effects, it is also possible to dye only the synthetic resin used to produce the pigment-free layer adjacent the backing.

The backing is preferably a film or foil which does not melt under pressing conditions, or it is a paper which has been finished adhesively relative to the synthetic resin layer.

If such a transfer sheet is pressed at elevated temperatures onto a flat substrate, the synthetic resin forming the two surface layers flows and, if it is a duroplastic resin, cures. In so doing, the synthetic resin assumes the surface structure of the transfer sheet. The flow process of the synthetic resin during the pressing operation is additionally affected by unevennesses and differences in density of the substrate to be improved. This results in an uneven distribution of the flake-shaped (lamellar) pigment in the synthetic resin layer because, when the resin flows, the pigment, as a result of its lamellar structure, orients itself in the direction of flow. The flow structures are reproduced in this manner. This effect is particularly intensified and identifiable owing to the fact that the layer of synthetic resin facing the backing is free of pigments and thus, as a result of the dilution effect, quantitatively intensifies the flow of the resin. The orientation of the pigment particles is thus intensified further.

The surface obtained after the pressing exhibits a decor image which has a pronounced marmoration due to the uneven distribution of the pigment.

Corresponding to feature b) of the inventive method, the pressing of the transfer sheet onto the substrate is carried out with a press tool which is devoid of any surface pattern or profile. Prior to this invention, the pressing was carried out with patterned tools. It has been ascertained that pressing with a tool having a surface pattern or profile such as disclosed in DE-A 2 650 560 impedes the free flow of the resins to regions of less density. This in turn negatively affects the directional orientation of the flake-like pigment particles in the flow direction. However, it will be understood that a certain depth of roughness of the press tool surface is permissible as long as the free flow of the resin is not impeded.

The varying flow of the coating resin can moreover be brought about or intensified by producing intentionally selective surface unevennesses in the material or substrate to be finished. This can be accomplished, for example, by arranging in a regular or irregular fashion geometrically shaped fragments of a resin-coated sheet below the resin-coated transfer sheet, which is to form the surface layer of the material to be finished. These fragments thus are located between the substrate and the pigmented layer in the final product. These fragments may, for example, be placed so as to form a pattern. Such fragments may have any geometric shape and be formed symmetrically or irregularly. The fragments may have the shape of a foilage leaf or the like. Dried and, optionally, resin-impregnated natural leaves such as oak leaves may also be inserted, the surface structures of the leaves then appearing clearly in the finished product. The inserted fragments clearly stand out in color and marmoration from the surrounding background.

This marmoration effect is particularly emphasized with respect to color if the material to be finished pursuant to the invention has a uni-colored, transparent layer at the surface, the color of which contrasts with the inherent color of the pigment. For example, lustrous pigments with a gold or blue color can be used to good effect with a transfer sheet that has been dyed blue.

The surface improved flat materials have a number of desirable properties. They are wear and scratch resistant and moreover exhibit resistance to solvents. These properties, together with the highly decorative esthetic effect obtained by the inventive method, result in superior products. In view of the excellent properties of the improved materials, they are suitable for the production of articles and objects in which decorative surfaces are desired such as doors, furniture, table tops, facade elements, exhibition booths and for the interior decorating of rooms, waiting halls, foyers, ticket booths and the like.

Lacquer films are known from the art which consist of two layers, the lower layer of which contains mica-like pigments while the upper layer (covering layer) is free of pigments. Such lacquer structures which are used, for example, in the automobile industry for the preparation of metal effect lacquers (metal paints) are described, for instance, in the German Offenlegungsschrift 3,207,936 or the German Offenlegungsschrift 3,150,492. These lacquer structures differ significantly, however, from the present invention in that no pressure is exerted while applying the lacquer layers on the substrate. The above-described flow processes thus do not take place. The pigments are distributed uniformly in the lacquer layer. Therefore, if the pigment content in the lacquer layer is too low, only an iridescent effect occurs (German Offenlegungsschrift 3,150,492, page 6 at the bottom). An uneven pigment distribution would also be highly undesirable when lacquering an automobile body sheet or the like.

To prepare the surface finishing films or layers of the transfer sheet, the known, curable duroplastic or nonreactive thermoplastic resins may be used as coating resins. Suitable curable resins are the curable polyester resins based on esters of unsaturated dicarboxylic acids or mixtures of saturated and unsaturated dicarboxylic acids in a reactive solvent such as styrene. Further suitable polyesters are described, for example, in German Patents 3,403,691 and 2,734,669. As curable coating resins, curable acrylate or methacylate resins or epoxide resins are also suitable. Thermoplastic coating resins may be built up on the basis of melamine resins etherified with short-chain aliphatic alcohols. Other examples of suitable thermoplastic coating resins are polyester resins or resins based on acrylate.

As support sheet or backing, foils, films or sheets of paper may be used. However, these flat backings must show adhesive properties relative to the coating resin, at least after the finishing process, so that they can be pulled off from the finished surface. Examples of suitable foils are metal foils, such as aluminum foil, which is usually provided with a release lacquer and reinforced on the back with paper. The metal foil has a thickness of about 10 μm and the paper on the back weighs 50 to 100 g/m². Furthermore, plastic resin film, such as poly-propylene film, reinforced on the back with paper, is suitable. The polypropylene film advantageously has a thickness of 20 to 50 μm and the paper on the back a weight of 80 to 120 g/m².

If paper sheets are used as backing, they must be imparted with adhesive properties through a suitable coating. For this purpose, particularly the well known silicone resins, especially the radiation cured silicone resins, come into consideration. They are described, for example, in German Patent 3,426,087, German Offenlegungsschrift 3,533,350 and German Offenlegungsschrift 3,621,629.

As will be appreciated from the above, the gist of the invention is an improved method for imparting substrates of the indicated kind with decorative marbleized surface coating wherein the pressing procedure is carried out with a pressing tool having a substantially flat press surface devoid of pattern, embossing or other profiling. The transfer sheet has two superimposed synthetic resin layers. The outer layer contains the flake-like (lamellar) pigment of the indicated size dimensions and in the indicated amounts while the synthetic resin layer closest to the backing of the transfer sheet is devoid of pigments. Due to the fact that the press tool has a substantially planar press surface and the inherent unevennesses of the substrate to be surface improved, distinct flow conditions are created which impart the finished surface with the desired marbleized effect. This is so because the flake-like pigment distributes itself in an irregular manner in the resin layer in dependence on the flow movement of the resin during the pressing procedure. This causes the marbleized effect.

In the following examples, the preparation of the inventive transfer sheets with their surface finishing films and their processing is described in greater detail, it being understood that these examples are given by way of illustration and not by way of limitation.

EXAMPLE 1

As support sheet or backing, a paper with a weight of 120 g/m² and with an adhesive surface is used.

The composition of the resin is as follows:

Transparent coating resin:
310 g free-flowing, unsaturated polyester resin
40 g diallyl phthalate prepolymer
35 g partially etherified melamine-formaldehyde resin
284 g dichloromethane
3 g p-toluenesulfonic acid
13 g internal release agent
2 g benzoyl peroxide paste
17 g peroxide mixture Pigmented coating resin: as above, however with the addition of 50 g of Iriodin® pigment Rotbraun 502, with a particle size of 10 to 60 μm.

The transparent coating resin is applied with a doctor blade at the rate of 40 g/m² on the adhesive side of the paper sheet. The solvent is evaporated off in a drying duct at 40° to 80° C. The residual solvent content is 8 to 9%. The pigmented coating resin is then applied with a second metering device in the same amount and dried in the same manner.

To prepare a surface-improved, molded laminated material, the following construction is introduced into a hot press;

forming pad
pressing plate
transfer sheet, coated pursuant to the invention
melamine resin-impregnated black decor paper: weight of paper = 80 g/m²; resin content: 80 g/m² solid resin 10 phenolic resin-impregnated core films: weight of paper = 150 g/m$^2$; resin content: 70 g/m$^2$ solid resin
release paper
pressing plate
forming pad The pressing is carried out in a platen press at a pressure of 10 N/mm$^2$, a temperature of 145° C. and a pressing time of 20 minutes. The pressed material is cooled under pressure and removed from the press. The backing on the upper side of the molded laminated article is pulled off.

A molded, laminated material with a copper-color, marmorated surface is obtained. The black melamine resin film partially shines through as background.

EXAMPLE 2

As support sheet or backing is used a 10 μm thick aluminum foil, which has been coated with a release lacquer and which is reinforced on the back with 60 g/m$^2$ paper.

Used as coating resins are:
transparent coating resin:
100 g melamine-formaldehyde resin, etherified with butanol, as a 55 to 60% by weight solution in a butanol-xylene mixture
1 g p-toluenesulfonic acid, as a 50% by weight solution in methanol
Pigmented coating resin: as above, however with 3 g of Iriodin ® pigment Glitzerbronce 530, with a particle size of 10 to 100 μm.

The transparent coating resin is applied on the backing at the rate of 40 g/m$^2$. The solvent is evaporated off in a drying duct at 60° to 110° C. In a second application, the pigmented resin is applied in the same manner and the product obtained is dried.

For the preparation of the surface-improved molded laminated material, the following construction is introduced into the hot press:
forming pad
pressing plate
backing, coated pursuant to the invention (transfer sheet)
melamine resin-impregnated dark-brown decor paper: weight of paper: 80 g/m$^2$; resin content: 80 g/m$^2$ solid resin;
50 phenolic resin-impregnated core films: weight of paper: 150 g/m$^2$ resin content: 70 g/m$^2$ solid resin
melamine resin-impregnated dark-brown decor paper: weight of paper: 80 g/m$^2$; resin content: 80 g/m$^2$ solid resin
transfer sheet coated pursuant to the invention
pressing plate
forming pad The pressing is carried out in a platen press at a pressure of 10 N/mm$^2$, a temperature of 145° C. and a pressing time of 45 minutes. The pressed material is cooled under pressure and removed from the press. The adhesive backing sheets on the top and bottom sides of the molded laminated article are pulled off.

A panel is obtained with decorative marmoration on both sides. The surface is lustrous with a silky appearance.

EXAMPLE 3

As backing is used a polypropylene film reinforced with paper. The thickness of the polypropylene film is 30 μm and the weight of the paper on the reverse side is 100 g/$^2$.

The coating resins used are:
Transparent coating resin:
100 g diallyl phthalate prepolymer
100 g dichloromethane
3 g internal release agent
0.5 g benzoyl peroxide paste
4 g peroxide paste
Pigmented coating resin: as above, however with 10 g Iriodin ® pigment Goldperl 300 with a particle size of 10 to 60 μm.

The coated transfer sheet is prepared as described in Example 1.

For the preparation of a surface-improved chipboard panel, the following construction is pressed:
forming pad
pressing plate
transfer sheet, coated pursuant to the invention
melamine resin-impregnated green decor paper: weight of paper: 80 g/m$^2$; resin content: 80 g/m$^2$ solid resin
melamine resin-impregnated barrier film: weight of paper: 120 g/m$^2$; resin content: 150 g/m$^2$ solid resin
chipboard
melamine resin-impregnated barrier film as above
melamine resin impregnated green decor paper as above
transfer sheet, coated pursuant to the invention
pressing plate
forming pad The pressing is carried out in a platen press at a pressure of 2 N/mm$^2$, a temperature of 145° C. and a pressing time of 12 minutes. The pressed material is taken from the press without first being cooled. The adhesive backing sheets on the top and bottom sides are pulled off. The panel obtained, which is finished or surface-improved on both sides, exhibits decorative marmoration and is especially suitable, for example, for indoor installations (furniture, self-erecting screens, exhibition constructions).

EXAMPLE 4

The method of Example 1 is repeated. However, 4 g of the solvent-soluble dye, Zaponblau, are added to the transparent coating resin. A surface coloration results with marmoration corresponding to the varying blue coloration.

EXAMPLE 5

A backing sheet, as described in Example 1, is coated. The coating resins used are:
Pigmented coating resin:
120 g diallyl phthalate prepolymer
80 g dichloromethane
2.5 g internal release agent
4 g dicumyl peroxide
4 g aluminum paste
0.4 g carbon black paste
Transparent coating resin: as above, however unpigmented.

The coated backing sheet is prepared as in Example 1 and a surface-finished chipboard as in Example 3. A surface improved panel is obtained, which has a silver metallic marmoration and is especially suitable for the manufacture of decorative surfaces.

What is claimed is:
1. In a method of surface improving a generally flat substrate by providing it with a surface coating, wherein a transfer sheet having a backing and being coated with synthetic resin is pressed with a pressing tool at elevated temperature onto the substrate, so that the resin of the transfer sheet is transferred to the substrate, whereafter the backing is pulled off, the improvement which comprises providing a transfer sheet having
- a first pigment free layer of a transparent thermoplastic or duroplastic synthetic resin which is capable of flowing when pressed at elevated temperatures, said first layer being adjacent said backing,
- a second layer of thermoplastic or duroplastic synthetic resin which is capable of flowing when pressed at elevated temperatures, said second layer being superimposed on said first layer, said second layer having incorporated therein 2 to 40% by weight, calculated on the amount of synthetic resin, of a flake-shaped lamellar pigment and pressing said transfer sheet onto the substrate by means of a press tool which is devoid of surface pattern or profile at a temperature and pressure effective to cause the first and second layers to flow and the pigment particles to orient themselves in the direction of flow, whereby a surface coating with a marbleized appearance is obtained.

2. The improvement as claimed in claim 1, wherein the particle size of said pigment in respect to its planar extension is about between 5 to 100 μm.

3. The improvement as claimed in claims 1 or 2, wherein said pigment is present in said second layer in an amount of between about 5 to 20% by weight, calculated on synthetic resin.

4. The improvement as claimed in claim 1, wherein said pigment is mica.

5. The improvement as claimed in claim 4, wherein said mica has a metal oxide surface.

6. The improvement as claimed in claim 5, wherein said metal oxide surface is titanium dioxide or iron oxide.

7. The improvement as claimed in claim 1, wherein said pigment comprises metals or metal alloys.

8. The improvement as claimed in claim 1, wherein said pigment is an aluminum pigment coated with iron oxide.

9. The improvement as claimed in claim 1, wherein the backing of said transfer sheet is of a material that does not melt under the pressing conditions and has adhesive characteristics in respect to said synthetic resin layers.

10. The improvement of claim 1, wherein at least one of said first and second synthetic resin layers is dyed with a dye which is soluble in the synthetic resin.

11. The improvement of claim 1, wherein said first and second synthetic resin layers are dyed with a dye which is soluble in the synthetic resin, the dye for dying said first layer having a different color than the dye for dying said second layer.

12. The improvement of claim 1, wherein a pattern-forming shaped sheet fragment is placed between the transfer sheet and the substrate before pressing the transfer sheet onto the substrate.

13. A method of surface improving a generally flat substrate of molded or laminated wood products or the like which comprises
   (a) pressing on said substrate at elevated temperature a transfer sheet having an adhesive backing and being coated with
   a first pigment free layer of a transparent thermoplastic or duroplastic synthetic resin which is capable of flowing when pressed at elevated temperatures, said first layer being adjacent said backing,
   a second layer of a thermoplastic or duroplastic synthetic resin which is capable of flowing when pressed at elevated temperatures, said second layer being superimposed on said first layer, said second layer having incorporated therein 2 to 40% by weight, calculated on the amount of synthetic resin, of a flake-shaped lamellar pigment,
   said pressing of said transfer sheet onto the substrate being carried out with a press tool which is devoid of surface pattern or profile, and under pressure and temperature conditions such that the first and second resin layers flow and the pigment particles orient themselves in the direction of flow, whereby a coating with marbleized appearance is formed, and
   (b) removing the backing.

* * * * *